(12) United States Patent
Hällqvist et al.

(10) Patent No.: US 8,944,016 B2
(45) Date of Patent: Feb. 3, 2015

(54) MOTOR VEHICLE WITH HEAT TRANSFER BETWEEN CAB AND FRAME

(75) Inventors: Thomas Hällqvist, Rönninge (SE); Zoltan Kardos, Södertälje (SE)

(73) Assignee: Scania CV AB (SE)

( * ) Notice: Subject to any disclaimer, the term of this patent is extended or adjusted under 35 U.S.C. 154(b) by 18 days.

(21) Appl. No.: 13/976,501

(22) PCT Filed: Jan. 12, 2012

(86) PCT No.: PCT/SE2012/050015
§ 371 (c)(1),
(2), (4) Date: Aug. 1, 2013

(87) PCT Pub. No.: WO2012/099524
PCT Pub. Date: Jul. 26, 2012

(65) Prior Publication Data
US 2013/0298849 A1    Nov. 14, 2013

(30) Foreign Application Priority Data
Jan. 18, 2011 (SE) ..................... 1150026

(51) Int. Cl.
*F01P 3/00* (2006.01)
*B62D 33/067* (2006.01)
*B60H 1/00* (2006.01)
*B62D 33/073* (2006.01)

(52) U.S. Cl.
CPC .............. *F01P 3/00* (2013.01); *B60H 1/00378* (2013.01); *B62D 33/073* (2013.01)
USPC .......... 123/41.01; 180/327; 180/328; 165/41; 237/12.3 A

(58) Field of Classification Search
CPC ............. B62D 33/063; B62D 33/0633; B62D 33/067; B60H 1/00378; B60H 1/08; B60H 1/10

USPC ..................... 123/41.01; 165/41; 237/12.3 A; 180/327, 328
See application file for complete search history.

(56) References Cited

U.S. PATENT DOCUMENTS

| | | | | |
|---|---|---|---|---|
| 4,211,364 A | * | 7/1980 | Sickler ..................... | 237/12.3 A |
| 4,505,348 A | * | 3/1985 | Gadefelt et al. ........... | 180/89.14 |
| 2007/0007061 A1 | * | 1/2007 | Meyer et al. ................. | 180/68.1 |

FOREIGN PATENT DOCUMENTS

| | | |
|---|---|---|
| EP | 2 174 810 A2 | 4/2010 |
| WO | WO 83/03575 A1 | 10/1983 |
| WO | WO 2005/120868 A1 | 12/2005 |

OTHER PUBLICATIONS

International Search Report dated Feb. 16, 2012 issued in corresponding International patent application No. PCT/SE2012/050015.

*Primary Examiner* — Lindsay Low
*Assistant Examiner* — Kevin Lathers
(74) *Attorney, Agent, or Firm* — Ostrolenk Faber LLP

(57) ABSTRACT

A motor vehicle includes a cab unit (3) tiltable relative to a vehicle frame (2) between a lowered state and a raised state. A first circuit (10) on the vehicle frame circulates a first medium. A second circuit (20) in the cab unit circulates a second medium. A heat transfer arrangement (4) transfers heat between the media. The arrangement includes a first heat transfer unit (11) on the vehicle frame, and in the first circuit and the first medium flows through it, and a second heat transfer unit (21) on the cab unit and in the second circuit and the second medium flows through it. These heat transfer units (11, 21) are in heat-transferring contact when the cab unit is in the lowered state and are separated when the cab unit is in the raised state.

16 Claims, 4 Drawing Sheets

MOTOR VEHICLE WITH HEAT TRANSFER BETWEEN CAB AND FRAME

CROSS-REFERENCE TO RELATED APPLICATIONS

The present application is a 35 U.S.C. §§371 national phase conversion of PCT/SE2012/050015, filed Jan. 12, 2012, which claims priority of Swedish Application No. 1150026-1, filed Jan. 18, 2011, the contents of which are incorporated by reference herein. The PCT International Application was published in the English language.

FIELD OF THE INVENTION AND PRIOR ART

The present invention relates to a motor vehicle and particularly to a heat transfer arrangement between a vehicle frame and its separate and movable cab unit.

In a motor vehicle there are usually a plurality of heat-generating components which need cooling, e.g. a combustion engine usually cooled by a water-based cooling medium, or a gearbox usually cooled by oil as cooling medium. The heat absorbed by the cooling medium may be given off to the surroundings via a radiator device situated at the front of the vehicle and comprising one or more radiator elements for cooling the cooling medium. Each radiator element has elongate pipelines with cooling flanges connected to them, and the cooling medium which is to be cooled is led through these pipelines in order to give off heat via their walls and the cooling flanges to ambient air which passes through air passages between the pipelines. The cooling medium is thus cooled by the ambient air passing between the pipelines. The cooling flow of ambient air through the air passages is generated by the vehicle's forward movement and/or by a fan. The heat absorbed by the cooling medium may also be used to warm the vehicle's driver space and/or passenger space by the cooling medium being led through a heat exchanger, thereby giving off heat to air which passes through the heat exchanger. The warmed air is then led into the driver space and/or the passenger space.

Modern motor vehicles are often also provided with an air conditioning system to cool their driver space and/or passenger space. Such an air conditioning system comprises inter alia an evaporator in which the system's working medium is vaporised, thereby absorbing heat from passing air. The air thus cooled is then led into the driver space and/or the passenger space. The air conditioning system further comprises a condenser which may be situated at the front of the vehicle and in which the working medium is condensed, thereby giving off heat to passing ambient air.

In certain heavy motor vehicles, e.g. certain types of tractor units and trucks, the driver space is situated in a cab unit which is hingingly connected to the frame of the vehicle and tiltable relative to the vehicle frame between a lowered state and a raised state. The normal situation is that the cab unit is in the lowered state and can be tilted forward to the raised state to provide access for servicing or repair of the engine situated under the cab unit. In a motor vehicle with tiltable cab unit it is usually the case that a heat exchanger situated in the cab unit to warm or cool cab air is connected to pipelines situated on the vehicle frame which form part of a cooling circuit or an air conditioning system via flexible hoses which extend between the cab unit and the vehicle frame. These hoses have to be relatively long to be able to remain connected between the cab unit and the vehicle frame when the cab unit is tilted forward from the lowered state to the raised state, which means that the hoses occupy a relatively large amount of space. They also risk damage by wear and tear during running of the vehicle and by wear and tear and buckling during tilting of the cab unit relative to the vehicle frame.

OBJECT OF THE INVENTION

The object of the present invention is to propose a solution to the above problem of liability to damage of hose runs between the tiltable cab unit and the frame of a motor vehicle fitted with it.

SUMMARY OF THE INVENTION

According to the present invention, said object is achieved by means of a motor vehicle having the features of the invention.

The motor vehicle according to the invention comprises
a first circuit situated on the vehicle's frame for circulation of a first medium,
a second circuit situated in the vehicle's tiltable cab unit for circulation of a second medium, and
a heat transfer arrangement for transfer of heat between said media.

The heat transfer arrangement comprises a first heat transfer unit fitted on the vehicle frame, facing towards the cab unit and incorporated in the first circuit in order to have said first medium flowing through it, and a second heat transfer unit fitted on the cab unit, facing towards the vehicle frame and incorporated in the second circuit in order to have said second medium flowing through it. These heat transfer units are arranged to be in heat-transferring contact with one another when the cab unit is in the lowered state and be separate from one another when the cab unit is in the raised state.

The cab unit is thus provided with an independent circulation circuit which is only in heat-transferring contact with the circulation circuit fitted on the vehicle frame when the cab unit is in the lowered state. In the cab unit's lowered state the heat transfer units are in heat-transferring contact with one another and thus jointly constitute a heat exchanger with one heat transfer unit serving as the primary circuit of the heat exchanger and the other heat transfer unit serving as the secondary circuit of the heat exchanger. Tilting the cab unit forward to the raised state causes the heat transfer unit fitted on the cab unit to swing away from the vehicle frame jointly with the cab unit and be thereby parted from the heat transfer unit fitted on the vehicle frame, thereby breaking the heat-transferring contact between the cab unit's circulation circuit and the circulation circuit situated on the vehicle frame. The solution according to the invention makes it possible to dispense with the aforesaid hose runs between the cab unit and the vehicle frame, thereby eliminating the aforesaid problem of flexible hoses between the cab unit and the vehicle frame occupying space and being liable to suffer damage.

According to an embodiment of the invention, the first heat transfer unit is springingly suspended in the vehicle frame and/or the second heat transfer unit is springingly suspended in the cab unit. This makes it possible to maintain a satisfactory abutment force between the heat transfer units while at the same time enabling them to absorb the cab unit's movements relative to the vehicle frame when the vehicle is in motion.

According to another embodiment of the invention, the first heat transfer unit has a profiled, e.g. undulating, contact surface intended for heat-transferring engagement with a corresponding profiled contact surface of the second heat transfer unit. The profiling of the mutual contact surfaces of the heat transfer units makes it possible for there to be a relatively large heat transfer surface between the heat transfer units, while at the same time the profiling helps to keep the contact surfaces in position relative to one another in horizontal directions when the cab unit is in the lowered state.

According to a further embodiment of the invention, a heat exchanger for warming or cooling of cab air is incorporated in the second circuit in series with the second heat transfer unit. This makes it possible for the medium in the second circuit situated in the cab unit to absorb heat from the medium in the first circuit situated on the vehicle frame via the heat transfer arrangement and to give off this heat for warming of cab air via said heat exchanger, or to be cooled by the medium in the first circuit via the heat transfer arrangement and to cool cab air via said heat exchanger.

According to a further embodiment of the invention, a radiator device, fitted for example on the cab unit's roof, is incorporated in the second circuit in series with the second heat transfer unit to cool the second medium by means of ambient air which passes through this radiator device. By cooling the medium in the second circuit situated in the cab unit, this radiator device can indirectly contribute to cooling of the medium in the first circuit situated on the vehicle frame.

Other advantageous features of the motor vehicle according to the invention are indicated by the independent claims and the description set out below.

BRIEF DESCRIPTION OF THE DRAWINGS

The invention is described in more detail below on the basis of embodiment examples with reference to the attached drawings, in which.

DETAILED DESCRIPTION OF EMBODIMENTS OF THE INVENTION

Figure 1:
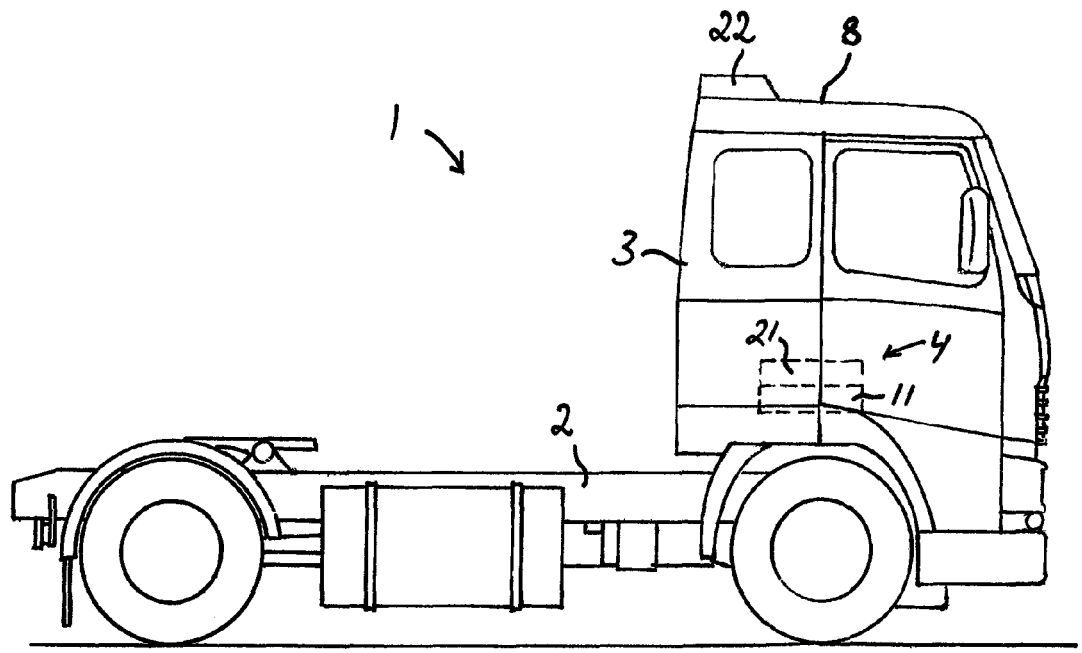
FIG. 1 is a schematic sideview of a motor vehicle according to an embodiment of the present invention with a tiltable cab unit in a lowered state.
Figure 2:
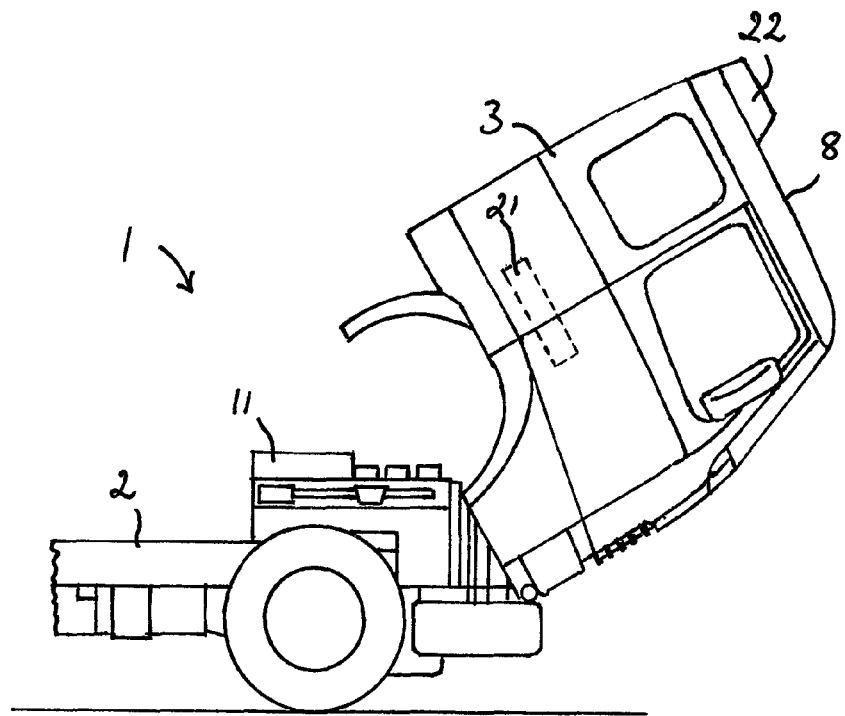
FIG. 2 depicts a motor vehicle according to FIG. 1 with the cab unit in a raised state.

FIGS. 1 and 2 illustrate a motor vehicle 1 according to an embodiment of the present invention. In this case the vehicle is a tractor unit. It comprises a vehicle frame 2 and a cab unit 3 with a driver space. The cab unit 3 is hingingly connected to the vehicle frame 2 and tiltable relative to it between a lowered state (see FIG. 1) and a raised state (see FIG. 2). In normal situations, inter alia when the vehicle is in motion, the cab unit 3 is in the lowered state and can be tilted forward to the raised state to allow access for servicing or repair to an engine situated under the cab unit.

Figure 3A:
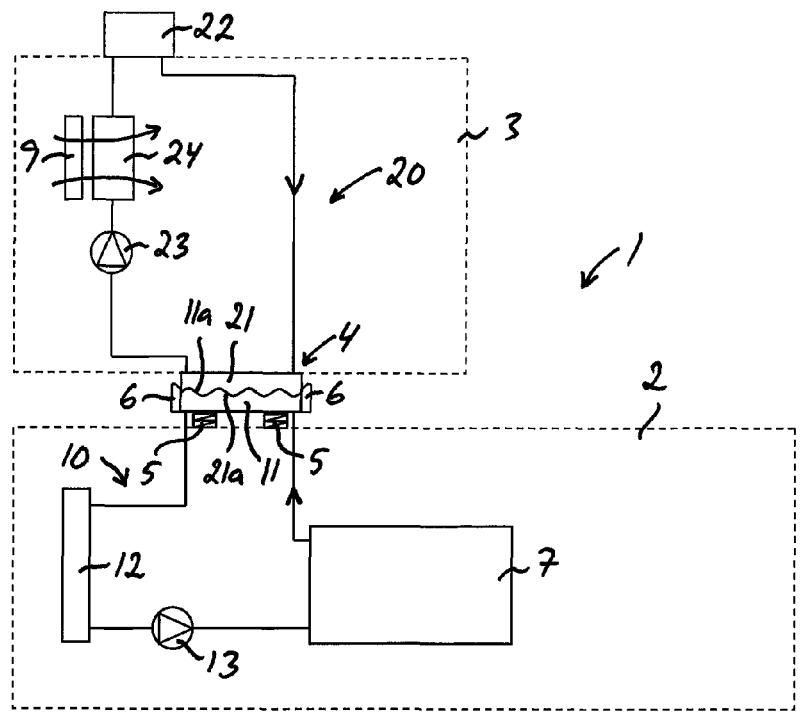
FIG. 3a is a schematic diagram of parts of the motor vehicle according to FIGS. 1 and 2 with its cab unit in a lowered state.
Figure 3B:
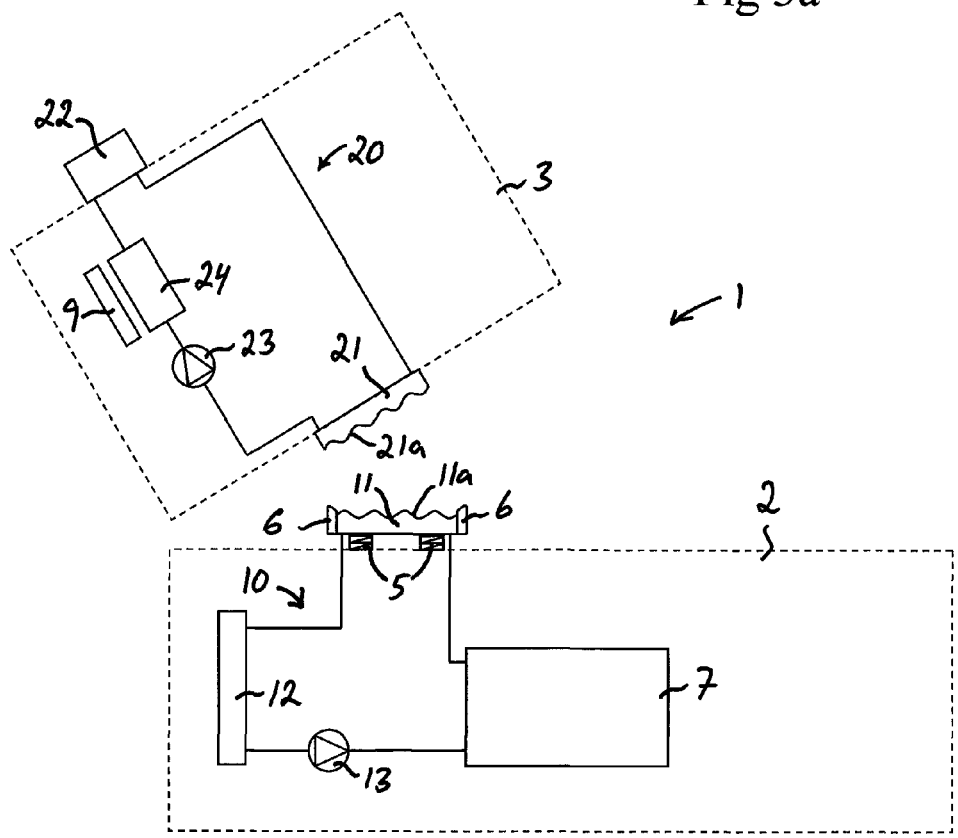
FIG. 3b depicts the same parts as FIG. 3a with the vehicle's cab unit in a raised state.

FIGS. 3a and 3b illustrate schematically parts of the vehicle 1. In FIGS. 3a and 3b, as also in FIGS. 4-6, the vehicle frame 2 and the cab unit 3 are each depicted in respective boxes bounded by broken lines. A first circuit 10 for circulation of a first medium is provided on the vehicle frame 2 and a second circuit 20 for circulation of a second medium is provided in the cab unit 3. The vehicle 1 further comprises a heat transfer arrangement 4 for transfer of heat between said media. The heat transfer arrangement comprises a first heat transfer unit 11 fitted on the vehicle frame 2 and facing towards the cab unit 3, and a second heat transfer unit 21 fitted on the cab unit 3 and facing towards the vehicle frame 2. The first heat transfer unit 11 is incorporated in the first circuit 10 in order to have the medium in the first circuit flowing through it, and the second heat transfer unit 21 is incorporated in the second circuit 20 in order to have the medium in the second circuit flowing through it. The heat transfer units 11, 21 are arranged to be in heat-transferring contact with one another when the cab unit 3 is in the lowered state as illustrated in FIG. 3a, and to be separate from one another when the cab unit 3 is in the raised state as depicted in FIG. 3b. The second heat transfer unit 21 swings up in conjunction with the cab unit 3 from the vehicle frame 2 during tilting of the cab unit and is thereby parted from the first heat transfer unit 11, thus breaking the mechanical and thermal contact between these heat transfer units 11, 21. When the cab unit 3 is in the lowered state, heat may thus be transferred between the medium in the first circuit 10 and the medium in the second circuit 20 via the heat transfer arrangement 4, but no such heat transfer is possible when the cab unit 3 is in the raised state.

In the embodiment illustrated in FIGS. 3a and 3b, the first heat transfer unit 11 is springingly suspended in the vehicle frame 2 via a suitable springing arrangement 5 which comprises one or more spring means adapted to springingly pressing the first heat transfer unit 11 against the second heat transfer unit 21 when the cab unit 3 is in the lowered state so that the heat transfer units 11, 21 are thereby kept in contact with one another during mutual movements between the cab unit 3 and the vehicle frame 2 when the vehicle 1 is in motion. Alternatively, the second heat transfer unit 21 might be springingly suspended in the cab unit 3 via a springing arrangement comprising one or more spring means adapted to resiliently pressing the second heat transfer unit 21 against the first heat transfer unit 11 when the cab unit 3 is in the lowered state. Similarly, third heat transfer arrangements 31, 31' mentioned below may be springingly suspended in the vehicle frame 2 and a fourth heat transfer arrangement 41' mentioned below may be springingly suspended in the cab unit 3.

The first heat transfer unit 11 has with advantage a profiled, e.g. undulating, contact surface 11a intended for heat-transferring engagement with a corresponding profiled contact surface 21a of the second heat transfer unit 21 when the cab unit 3 is in the lowered state. Third and fourth heat transfer arrangements 31, 31', 41' mentioned below are with advantage similarly provided with profiled contact surfaces.

One or more guide means 6 are with advantage provided close to the heat transfer units 11, 21 to keep them in position relative to one another in horizontal directions when the cab unit 3 is in the lowered state. These guide means 6 are with advantage integrated in the respective heat transfer units 11, 21. Similarly, one or more guide means are with advantage provided close to the third and fourth heat transfer arrangements 31, 31', 41' mentioned below.

In the embodiment depicted in FIGS. 3a and 3b, the first circuit 10 is connected to, in order to cool, a combustion engine 7 of the vehicle. The medium in the first circuit 10 takes the form in this case of radiator liquid, and a radiator liquid cooler 12 of conventional configuration is incorporated in the first circuit 10 to cool this radiator liquid. In the example illustrated, the first heat transfer unit 11 is arranged in series between the radiator liquid cooler 12 and the engine 7. In this situation the radiator liquid flows through, thereby absorbing heat from, the engine 7, then through the first heat transfer unit 11, thereby giving off heat to the medium in the second circuit 20, and thereafter through the radiator liquid cooler 12, thereby giving off heat to ambient air which passes through the radiator liquid cooler 12, after which the radiator liquid returns to the engine 7. A circulation pump 13 is provided in the first circuit 10 to circulate the medium in this circuit.

In the embodiment depicted in FIGS. 3a and 3b, a radiator device 22 is incorporated in the second circuit 20 in series with the second heat transfer unit 21 to cool the second medium by means of ambient air which passes through this radiator device. The radiator device 22 is with advantage fitted on the cab unit's roof 8, as illustrated in FIGS. 1 and 2.

In the embodiment depicted in FIGS. 3a and 3b, a heat exchanger 24 to warm cab air is also incorporated in the second circuit 20 in series with the second heat transfer unit 21 and the radiator device 22. This heat exchanger 24 is with advantage situated downstream of the second heat transfer unit 21 and upstream of the radiator device 22. In this situation the medium in the second circuit 20 thus flows through the second heat transfer unit 21, thereby absorbing heat from the medium in the first circuit 10, and then through the heat exchanger 24, thereby giving off heat to air which passes through this heat exchanger and thence into the cab unit's driver space. The medium in the second circuit 20 then flows through the radiator device 22, thereby giving off heat to ambient air which passes through this radiator device, after which the medium returns to the second heat transfer unit 21. A circulation pump 23 is provided in the second circuit 20 to circulate the medium in this circuit.

Figure 4:
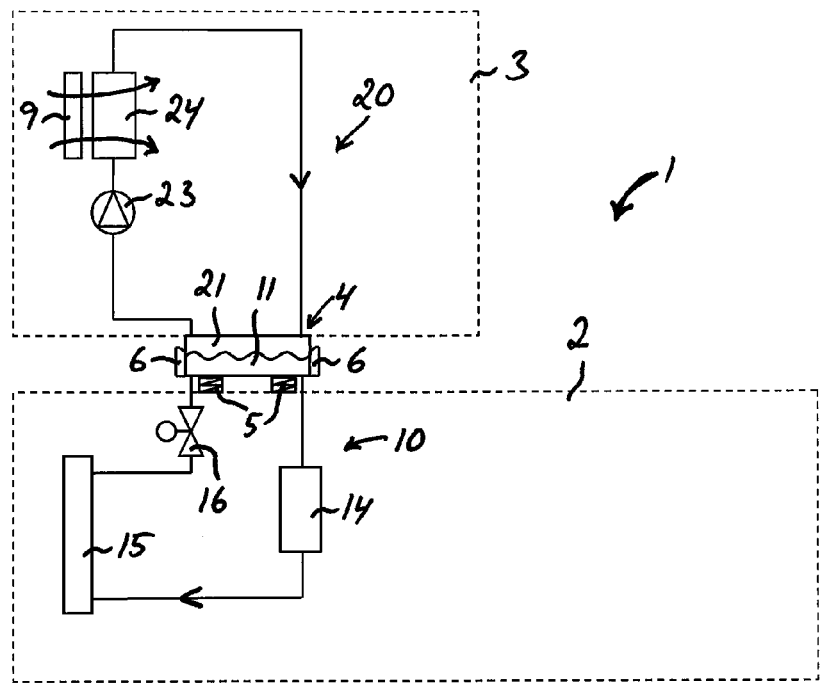
FIG. 4 is a schematic diagram of parts of a motor vehicle according to an alternative embodiment of the invention.

In the embodiment depicted in FIG. 4, the first circuit 10 and the second circuit 20 jointly form an air conditioning system of the vehicle 1. In this case the first heat transfer unit 11 takes the form of an evaporator intended to vaporise the medium in the first circuit 10, thereby absorbing heat from the medium in the second circuit 20 via the second heat transfer unit 21. The first circuit 10, which in this case serves as a cooling circuit to cool the medium in the second circuit 20, further comprises a compressor 14, a condenser 15 and an expansion valve 16 incorporated in series with one another and in series with the first heat transfer unit 11. The medium in the first circuit 10 is in this case a suitable type of refrigerant. The refrigerant is led in liquid form to the evaporator, i.e. the first heat transfer unit 11, in which it is converted to vapour by heat from the medium in the second circuit 20. The vapour is compressed to high pressure by the compressor 14 and then proceeds to the condenser 15, in which it condenses to liquid, thereby giving off heat to ambient air which passes through the condenser. The refrigerant leaves the condenser 15 in the form of liquid at high pressure and returns to the evaporator 11 via the expansion valve 16. During its passage through the expansion valve 16, the pressure and temperature of the refrigerant drop and it enters the evaporator 11 in the form of liquid at high pressure.

In the embodiment depicted in FIG. 4, a heat exchanger 24 for cooling of cab air is incorporated in the second circuit 20 in series with the second heat transfer unit 21. In this case the medium in the second circuit 20 thus flows through the second heat transfer unit 21, thereby giving off heat to the refrigerant in the first circuit 10, and then through the heat exchanger 24, thereby absorbing heat from air which passes through this heat exchanger and thence into the cab unit's driver space, after which the medium in the second circuit 20 returns to the second heat transfer unit 21.

Figure 5:
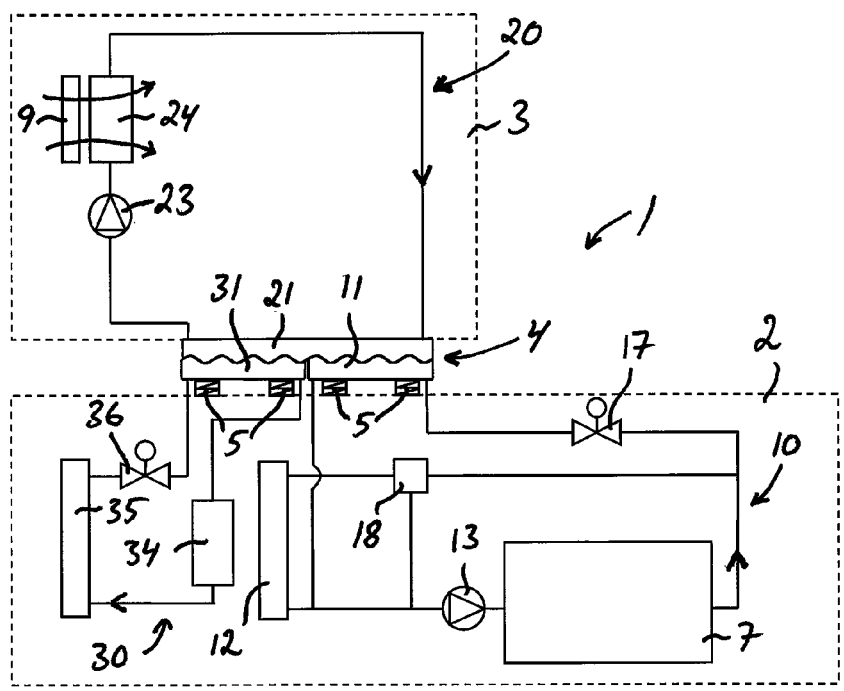
FIG. 5 is a schematic diagram of parts of a motor vehicle according to a further alternative embodiment of the invention.

In the embodiment depicted in FIG. 5, the vehicle 1 comprises a first circuit 10 situated on the vehicle frame 2 to circulate a first medium, a second circuit 20 situated in the cab unit 3 to circulate a second medium, and a third circuit 30 situated on the vehicle frame 2 to circulate a third medium. The heat transfer arrangement 4 comprises in this case a first heat transfer unit 11 incorporated in the first circuit 10, a second heat transfer unit 21 incorporated in the second circuit 20 and a third heat transfer unit 31 incorporated in the third circuit 30. The first and third heat transfer units 11, 31 are fitted on the vehicle frame 2 and face towards the cab unit 3, and the second heat transfer unit 21 is fitted on the cab unit 3 and faces towards the vehicle frame 2. In this case the first and third heat transfer units 11, 31 are arranged to be in heat-transferring contact with the second heat transfer unit 21 when the cab unit 3 is in the lowered state and to be separated from the second heat transfer unit 21 when the cab unit is in the raised state. When the cab unit 3 is in the lowered state, heat may be transferred via the heat transfer arrangement 4 between the media in said first and second circuits 10, 20 and between the media in said second and third circuits 20, 30.

Figure 6:
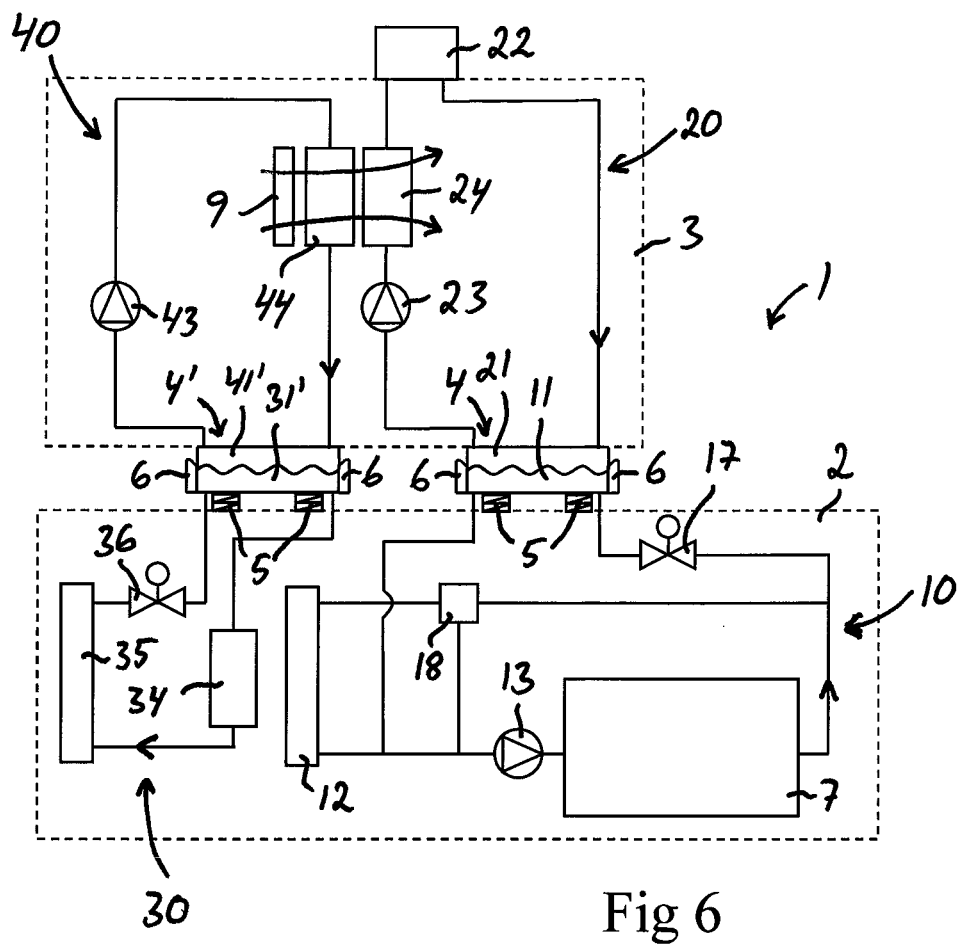
FIG. 6 is a schematic diagram of parts of a motor vehicle according to a further alternative embodiment of the invention.

In the embodiment depicted in FIG. 6, the vehicle 1 comprises a first circuit 10 situated on the vehicle frame 2 to circulate a first medium, a second circuit 20 situated in the cab unit 3 to circulate a second medium, a third circuit 30 situated on the vehicle frame 2 to circulate a third medium and a fourth circuit 40 situated in the cab unit 3 to circulate a fourth medium. The vehicle 1 comprises in this case a first heat transfer arrangement 4 to transfer heat between the media in the first and second circuits 10, 20 and a second heat transfer arrangement 4' to transfer heat between the media in the third and fourth circuits 30, 40. The first heat transfer arrangement 4 comprises a first heat transfer unit 11 incorporated in the first circuit 10 and a second heat transfer unit 21 incorporated in the second circuit 20, while the second heat transfer arrangement 4' comprises a heat transfer unit 31', herein called the third heat transfer unit, incorporated in the third circuit 30, and a heat transfer unit 41', herein called the fourth heat transfer unit, incorporated in the fourth circuit 40. The first and third heat transfer units 11, 31' are fitted on the vehicle frame 2 and face towards the cab unit 3, and the second and fourth heat transfer units 21, 41' are fitted on the cab unit 3 and face towards the vehicle frame 2. In this case the first heat transfer unit 11 is arranged to be in heat-transferring contact with the second heat transfer unit 21, and the third heat transfer unit 31' is arranged to be in heat-transferring contact with the fourth heat transfer unit 41', when the cab unit 3 is in the lowered state, and to be separated from one another when the cab unit is in the raised state. When the cab unit 3 is in the lowered state, heat may be transferred via the first heat transfer arrangement 4 between the media in said first and second circuits 10, 20 and via the second heat transfer arrangement 4' between the media in said third and fourth circuits 30, 40.

In the embodiments depicted in FIGS. 5 and 6, the first circuit 10 is connected to, in order to cool, a combustion engine 7 of the vehicle. The medium in the first circuit takes the form in this case of radiator liquid, and a radiator liquid cooler 12 of conventional configuration is incorporated in the first circuit 10 to cool it. In the examples depicted, the first heat transfer unit 11 is connected in parallel with the radiator liquid cooler 12. In this case the radiator liquid thus flows through, thereby absorbing heat from, the engine 7, and then through the first heat transfer unit 11, thereby giving off heat to the medium in the second circuit 20, or through the radiator liquid cooler 12, thereby giving off heat to ambient air which passes through the radiator liquid cooler 12. A circulation pump 13 is provided in the first circuit 10 to circulate the medium in this circuit. A regulating valve 17 is incorporated in the first circuit 10 in series with the first heat transfer unit 11. This regulating valve 17 may be used to regulate and, when necessary, halt the flow of radiator fluid through the first heat transfer unit 11. A thermostat 18 is also incorporated in a conventional way in the first circuit 10 between the engine 7 and the radiator liquid cooler 12. Radiator liquid is led from the engine 7 to the radiator liquid cooler 12 via this thermostat 18. At an initial stage after starting of the engine 7, when it has not yet become really warm, the thermostat 18 is arranged to direct radiator liquid back to the engine 7 without passing through the radiator liquid cooler 12, to facilitate rapid warming of the engine to desired working temperature.

In the embodiment depicted in FIG. 5, the third heat transfer unit 31 takes the form of an evaporator intended to vaporise the medium in the third circuit 30, thereby absorbing heat from the medium in the second circuit 20 via the second heat transfer unit 21. In the embodiment depicted in FIG. 6, the third heat transfer unit 31' similarly takes the form of an evaporator intended to vaporise the medium in the third circuit 30, thereby absorbing heat from the medium in the fourth circuit 40 via the fourth heat transfer unit 41'. The third circuit 30, which in this case serves as a cooling circuit to cool the medium in the second circuit 20 and in the fourth circuit 40, further comprises a compressor 34, a condenser 35 and an expansion valve 36 incorporated in series with one another and in series with the third heat transfer unit 31, 31'. The medium in the third circuit 30 is in this case a suitable type of refrigerant. The refrigerant is led in liquid form to the evaporator, i.e. the third heat transfer unit 31, 31', in which it is converted to vapour by heat from the medium in the second circuit 20 and fourth circuit 40 respectively. The vapour is compressed to high pressure by the compressor 34 and proceeds to the condenser 35 in which it condenses to liquid, thereby giving off heat to ambient air which passes through the condenser 35. The refrigerant leaves the condenser 35 in the form of liquid at high pressure and returns to the evaporator 31, 31' via the expansion valve 36. During its passage through the expansion valve 36, the pressure and temperature of the refrigerant drop and it enters the evaporator 31, 31' in the form of liquid at low pressure.

In the embodiment depicted in FIG. 5, a heat exchanger 24 to warm or cool cab air is incorporated in the second circuit 20 in series with the second heat transfer unit 21. When the regulating valve 17 is open and the compressor 34 is switched off while the engine 7 is running, radiator liquid flows through the first heat transfer unit 11 but no refrigerant flows through the third heat transfer unit 31. In this case the medium in the second circuit 20 flows through the second heat transfer unit 21, thereby absorbing heat from the radiator liquid in the first circuit 10, and then through the heat exchanger 24, thereby giving off heat to air which passes through this heat exchanger and thence into the cab unit's driver space. Warming of the cab air is thus effected. When the regulating valve 17 is closed and the compressor 34 is running, refrigerant flows through the third heat transfer unit 31 but no radiator liquid flows through the first heat transfer unit 11. In this case the medium in the second circuit 20 thus flows through the second heat transfer unit 21, thereby giving off heat to the refrigerant in the third circuit 30, and then through the heat exchanger 24, thereby absorbing heat from air which passes through this heat exchanger and thence into the cab unit's driver space. Cooling of the cab air is thus effected.

In the embodiment depicted in FIG. 6, a heat exchanger 24 to warm cab air is incorporated in the second circuit 20 in series with the second heat transfer unit 21, and a heat exchanger 44 to cool cab air is incorporated in the fourth circuit 40 in series with the fourth heat transfer unit 41'. A radiator device 22 is also incorporated in the second circuit 20 in series with the second heat transfer unit 21 to cool the second medium by means of ambient air which passes through this radiator device. A circulation pump 23 is provided in the second circuit 20 to circulate the medium in this circuit, and a circulation pump 43 is provided in the fourth circuit 40 to circulate the medium in this circuit.

When the regulating valve 17 is open and the engine 7 is running, radiator liquid flows through the first heat transfer unit 11 and the medium in the second circuit 20 flows through the second heat transfer unit 21, thereby absorbing heat from the radiator liquid in the first circuit 10, and then through the heat exchanger 24, thereby giving off heat to air which passes through this heat exchanger and thence into the cab unit's driver space. Warming of the cab air is thus effected.

When the compressor 34 is running, refrigerant flows through the third heat transfer unit 31' and the medium in the fourth circuit 40 flows through the fourth heat transfer unit 41', thereby giving off heat to the refrigerant in the third circuit 30 and then through the heat exchanger 44, thereby absorbing heat from air which passes through this heat exchanger and thence into the cab unit's driver space. Cooling of the cab air is thus effected.

The embodiment according to FIG. 6 makes it possible to use the third and fourth circuits 30, 40 to dry the cab air via the heat exchanger 44 of the fourth circuit and then to warm this dried cab air via the heat exchanger 24 in the second circuit. Alternatively, the heat exchanger 24 in the second circuit 20 and the heat exchanger 44 in the fourth circuit 40 may be used one at a time to respectively warm the cab air and cool/dry the cab air.

An adjustable fan 9 is provided close to the aforesaid heat exchangers 24, 44 in the cab unit 3 to drive air through each of them. The air driven through each of the heat exchangers 24, 44 comes either via an air intake from the vehicle's surroundings or via an air intake from the driver space.

The aforesaid radiator liquid cooler 12 is with advantage situated at the front of the vehicle and comprises one or more radiator elements for cooling the radiator liquid. Each radiator element has elongate pipelines, with cooling flanges connected to them, and the radiator liquid is led through these pipelines in order to give off heat via the pipeline walls and the cooling flanges to ambient air which passes through air passages between the pipelines. The radiator liquid is thus cooled by the ambient air passing between the pipelines. The cooling flow of ambient air through the air passages is generated by the vehicle's forward movement and/or by a fan.

The aforesaid condensers 15, 35 are with advantage situated at the front of the vehicle and the cooling flow of ambient air through them is generated by the vehicle's forward movement and/or by a fan.

In the embodiments according to FIGS. 3a, 3b, 5 and 6, the first circuit 10 might alternatively be connected to, in order to cool, a gearbox of the vehicle instead of being connected to the vehicle's engine, in which case the medium in the first circuit would take with advantage the form of a cooling medium in the form of oil.

Each heat transfer unit 11, 21, 31, 31', 41' is provided with one or more pipelines or ducts made of material with good heat conductivity and a contact surface which is intended for heat transfer to a cooperating heat transfer unit and which is situated close to said pipelines/ducts to enable it with good effectiveness to receive heat from/give off heat to a medium which flows through the pipelines/ducts.

The motor vehicle according to the invention is preferably a heavy vehicle, e.g. a tractor unit or truck.

The invention is of course in no way restricted to the embodiments described above, since many possibilities for modifications thereof are likely to be obvious to a specialist in the field without having thereby to depart from the invention's basic concept such as defined in the attached claims.

The invention claimed is:
1. A motor vehicle with a heat transfer arrangement:
the vehicle comprising:
a vehicle frame;
a cab unit which comprises a driver space, a separable connection between the cab unit and the vehicle frame such that the cab unit may be separated away from or moved to the vehicle frame;
a first circuit configured for circulation of a first medium and situated at the vehicle frame;
a second circuit configured for circulation of a second medium and situated at the cab unit;
the heat transfer arrangement configured and operable for transfer of heat between the first and second media; the heat transfer arrangement comprising:
a first heat transfer unit at the vehicle frame, facing towards the cab unit and incorporated in the first circuit to have the first medium flowing through the first heat transfer unit;
a second heat transfer unit at the cab unit, facing toward the vehicle frame and incorporated in the second circuit to have the second medium flowing through the second heat transfer unit; and
the first and second heat transfer units being located and respectively positioned as to be in heat-transferring contact with one another when the cab unit is moved to the frame and to be separated from one another when the cab unit is separated from the frame.

2. A motor vehicle according to claim 1, wherein the first heat transfer unit is springingly suspended at the vehicle frame and/or the second heat transfer unit is springingly suspended at the cab unit.

3. A motor vehicle according to claim 1, further comprising:
the first heat transfer unit has a profiled, first contact surface, and the second heat transfer unit has correspondingly profiled second contact surface configured and operable for heat-transferring engagement with the first contact surface.

4. A motor vehicle according to claim 1, further comprising a guide apparatus located close to the heat transfer units to keep them in position relative to one another in horizontal directions when the cab unit is at the vehicle frame.

5. A motor vehicle according to claim 1, further comprising a heat exchanger located and configured for warming or cooling of cab air in the cab unit, the heat exchanger is incorporated in the second circuit and in flow series with the second heat transfer unit.

6. A motor vehicle according to claim 1, further comprising a radiator device located at the cab unit and exposed for air flow thereover, the radiator device is incorporated in the second circuit in flow series with the second heat transfer unit and is configured for cooling of the second medium by ambient air which passes through the radiator device.

7. A motor vehicle according to claim 6, wherein the radiator device is on a roof of the cab unit.

8. A motor vehicle according to claim 1, further comprising a combustion engine; the first circuit is connected to, in order to cool, the combustion engine of the vehicle, while the first heat transfer unit gives off heat to the second heat transfer unit.

9. A motor vehicle according to claim 1, wherein the first heat transfer unit comprises an evaporator configured and operable to vaporise the first medium, for thereby absorbing heat from the second heat transfer unit; and
a heat exchanger located, configured and operable for cooling of cab air in the cab unit, the heat exchanger being incorporated in the second circuit in flow series with the second heat transfer unit.

10. A motor vehicle according to claim 9, wherein the first circuit further comprises for the first medium, a compressor, a condenser and an expansion valve which are incorporated in flow series with one another and in flow series with the first heat transfer unit.

11. A motor vehicle according to claim 1, further comprising:
a third circuit configured for circulating a third medium, the third circuit is situated at the vehicle frame;
the heat transfer arrangement further comprises a third heat transfer unit at the vehicle frame, facing towards the cab unit and incorporated in the third circuit for the third medium to flow through the third circuit, the third heat transfer unit being located, configured and operable to be in heat-transferring contact with the second heat transfer unit when the cab unit is at the vehicle frame and to be separated from the second heat transfer unit when the cab unit is separated from the vehicle frame.

12. A motor vehicle according to claim 11, further comprising:
a combustion engine;
the first circuit is connected to the combustion engine in order to cool the vehicle, and the first heat transfer unit is configured and operable to give off heat to the second heat transfer unit;
the third heat transfer unit comprises an evaporator configured and operable to vaporise the third medium, and thereby to absorb heat from the second heat transfer unit; and
a heat exchanger, configured and operable for warming or cooling of cab air in the cab unit, the heat exchanger is incorporated in the second circuit in flow series with the second heat transfer unit.

13. A motor vehicle according to claim 12, wherein the third circuit further comprises a compressor, a condenser and an expansion valve which are incorporated in flow series with one another and in flow series with the third heat transfer unit.

14. A motor vehicle according to claim 1, further comprising:
a third circuit situated at the vehicle frame and configured for circulation of a third medium, and a fourth circuit situated at the cab unit and configured for circulation of a fourth medium;
a further heat transfer arrangement configured for transfer of heat between the third and the fourth media, the further heat transfer arrangement comprises:
a third heat transfer unit at the vehicle frame, facing towards the cab unit and incorporated in the third circuit, and the third medium flows through the third circuit;
a fourth heat transfer unit at the cab unit, facing towards the vehicle frame and incorporated in the fourth circuit, and the fourth medium flows through the fourth circuit; and
the third heat transfer unit is located and configured to be in heat-transferring contact with the fourth heat transfer unit when the cab unit is at the vehicle frame and is separated from the fourth heat transfer unit when the cab unit is separated from the vehicle frame.

15. A motor vehicle according to claim 14, further comprising:
a combustion engine; the first circuit is connected to the combustion engine in order to cool the vehicle, the first heat transfer unit is configured and operable to give off heat to the second heat transfer unit;

a first heat exchanger configured and operable for warming or cooling of cab air in the cab unit, the first heat exchanger is incorporated in the second circuit in flow series with the second heat transfer unit;

the third heat transfer unit comprises an evaporator configured and operable to vaporise the third medium, and thereby to absorb heat from the fourth heat transfer unit; and a second heat exchanger configured and operable for cooling of cab air in the cab unit, the second heat exchanger is incorporated in the fourth circuit in flow series with the fourth heat transfer unit.

16. A motor vehicle according to claim 1, wherein the cab unit is hingedly connected to the vehicle frame and the cab unit is tiltable relative to the vehicle frame between a lowered state and a raised state, wherein at the lowered state, the cab unit is at the vehicle frame and the heat transfer units are in heat transferring contact and in the separated state, the cab unit is lowered off the vehicle frame.

\* \* \* \* \*